June 27, 1933.  H. T. THOMAS  1,915,701
HYDRAULIC BRAKE
Filed June 18, 1928  2 Sheets-Sheet 1
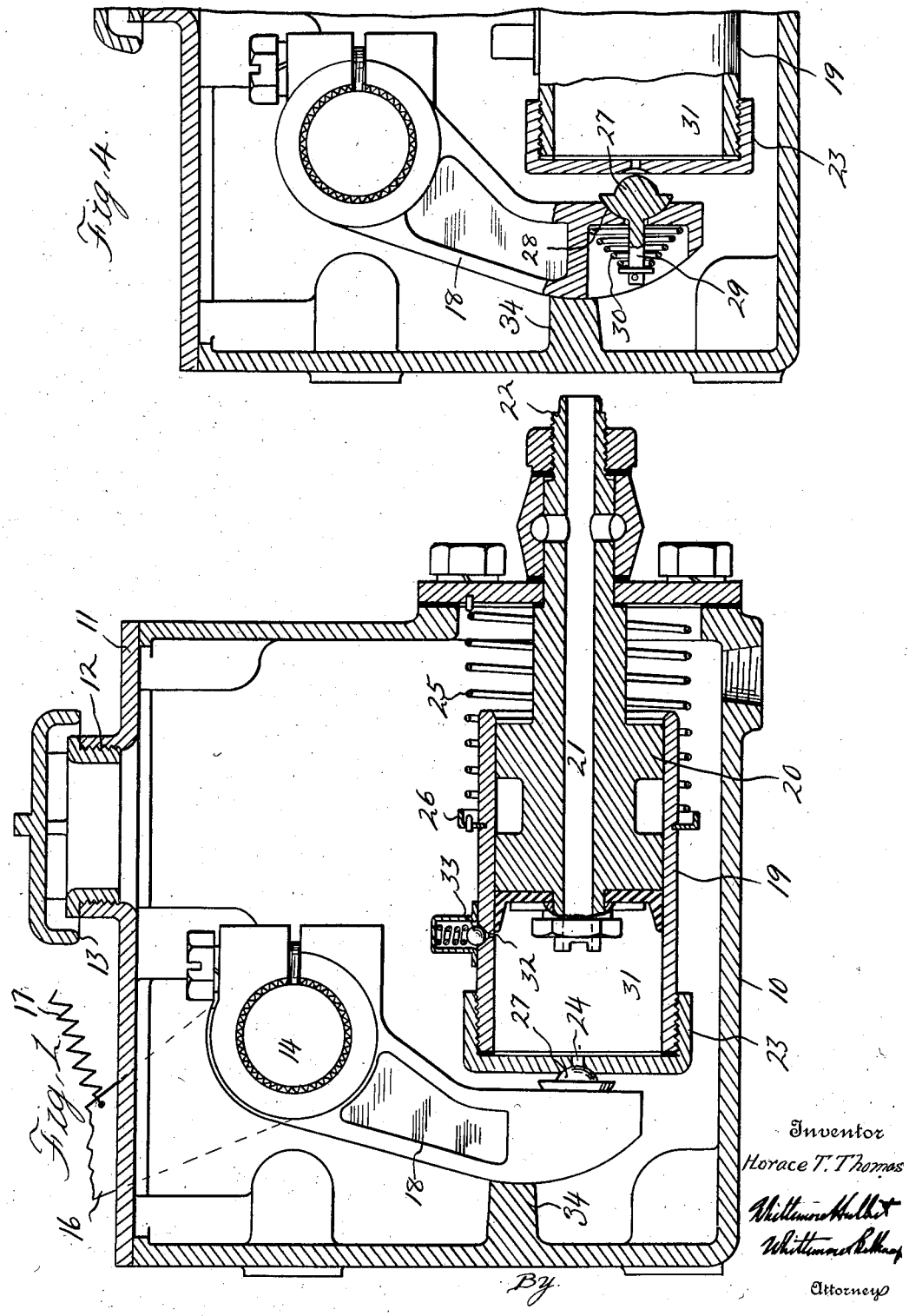
Inventor
Horace T. Thomas
Attorneys June 27, 1933.　　　H. T. THOMAS　　　1,915,701
HYDRAULIC BRAKE
Filed June 18, 1928　　2 Sheets-Sheet 2
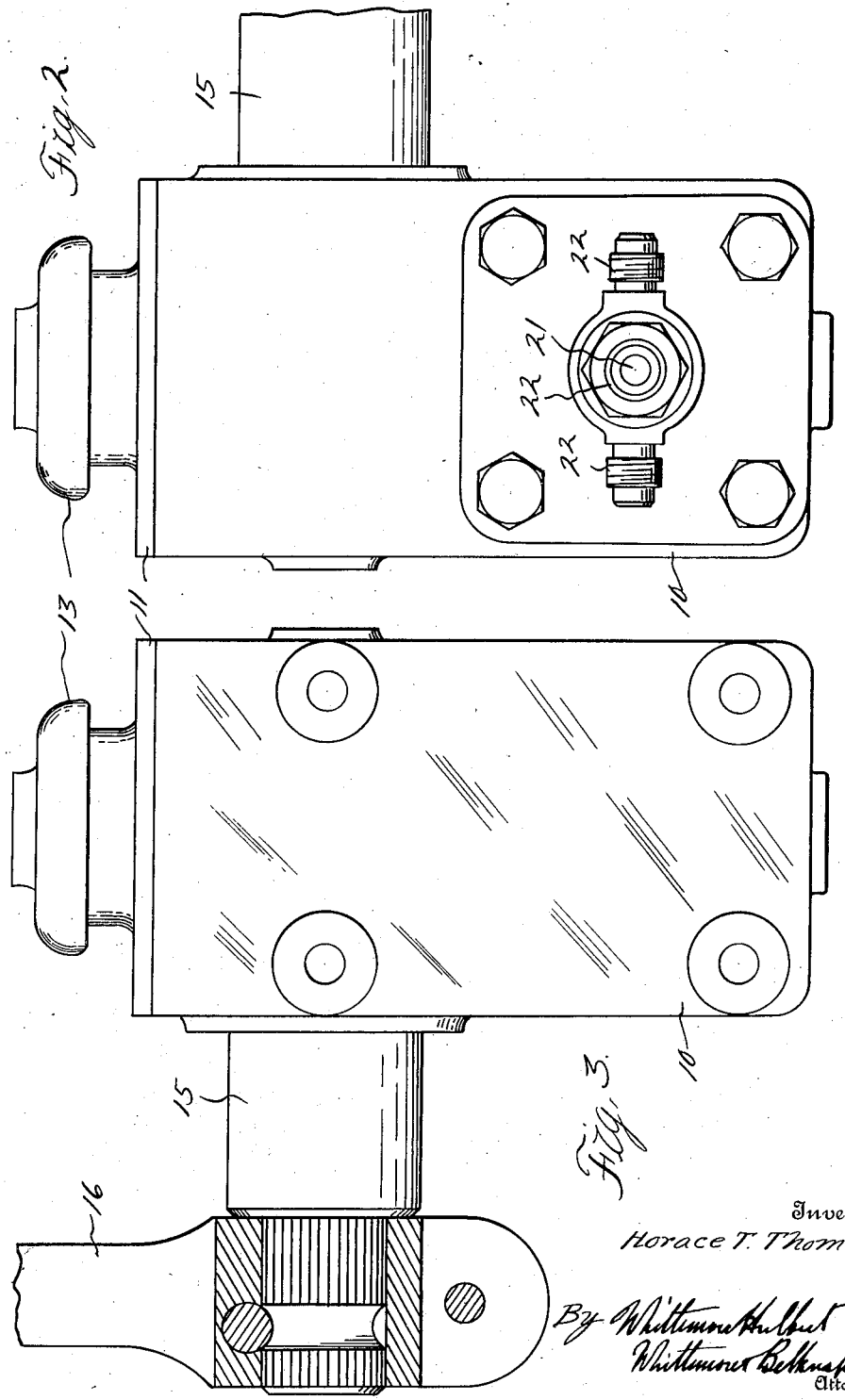
Inventor
Horace T. Thomas Patented June 27, 1933

1,915,701

UNITED STATES PATENT OFFICE

HORACE T. THOMAS, OF LANSING, MICHIGAN, ASSIGNOR TO REO MOTOR CAR COMPANY, OF LANSING, MICHIGAN, A CORPORATION OF MICHIGAN

HYDRAULIC BRAKE

Application filed June 18, 1928. Serial No. 286,382.

This invention relates to hydraulic brakes and more particularly to improvements therein tending to simplify, render more efficient and improve the same generally.

The invention pertains to hydraulic brakes and more particularly to an improved construction of master cylinder employed in connection with hydraulic brake systems.

One of the important objects of this invention is to provide a method and means whereby the master cylinder may be automatically maintained full of oil or other fluid.

Still another important object of this invention is to provide a method and means wherein any leakage in the system, as for instance at the brake cylinders, in the conduits leading thereto, or at the connection between these members, may be automatically compensated for.

Still another important object of this invention is to provide a master cylinder having means whereby a rapid back flow of the fluid from the braking cylinders to the master cylinder is facilitated thus insuring a prompt and satisfactory operation of the brake shoes insofar as the release is concerned.

The several objects, advantages and novel details of construction of this invention will be made more apparent as this description proceeds, especially when considered in connection with the accompanying drawings wherein:

Figure 1 is a vertical longitudinal sectional view through the master cylinder and the hydraulic brake system constructed in accordance with this invention.

Figure 2 is a front elevation of the structure illustrated in Figure 1.

Figure 3 is a rear elevation of the structure shown in Figure 1, and

Figure 4 is a fragmentary view of the master cylinder with the parts in a different position.

Referring now particularly to the drawings wherein like reference characters indicate like parts it will be noted that there is illustrated a casing or container 10 which constitutes the main reservoir for the braking fluid such as oil or the like. This chamber or container is closed by a cover 11 which latter is provided with a filler opening 12 closed by a removable cap 13.

Journaled in the housing 10 and extending transversely thereof is a shaft 14. This shaft extends without the casing, through a boss 15 and on the end thereof is secured the brake pedal 16. This brake pedal is provided with any means, such for instance as a spring 17 for normally returning the same to brake releasing position.

Fixed to the shaft 14, and interiorly of housing 10, is a short lever or arm 18. This lever or arm constitutes the instrumentality through which the master cylinder of the braking system is actuated.

The master cylinder just referred to consists of a movable cylinder 19 and a stationary piston 20. The piston is provided centrally longitudinally thereof with a passageway or bore 21 which communicates with a plurality of outlet couplings 22 by means of which connection is made with the conduits (not shown) leading to the braking cylinders (not shown) located at the wheels of the vehicle. The inner end of cylinder 19 may be closed by a cap 23 provided with a port 24. The cylinder 19 is normally urged toward the left as viewed in Figures 1 and 4, into brake releasing position, by means of a spring or the like 25 which bears on the one hand against the wall of housing 10 and on the other hand against an abutment 26 carried by the cylinder 19.

During the pressure stroke of the cylinder 19, or in other words during the time this cylinder is being moved toward the right, port 24 is closed by means of a valve 27 carried by lever 18. In the embodiment of the invention herein illustrated this valve 27 is in the form of a ball valve, provided at its rear with a semi-spherical portion 28 seating in a semi-spherical recess formed in the arm 18 and provided further with a stem 29 passing rearwardly through an aperture in this arm. Surrounding stem 29 is a spring 30 which acts to normally hold the valve 27 in the position illustrated.

During the pressure stroke of cylinder 19 port 24 is closed by valve 27 and consequently the braking fluid contained in the pressure chamber 31 of the cylinder is forced through passageway 21 and out through the outlet couplings 22 to the conduits of the brake system. However, immediately that the brake pedal 16 is released and is returned toward its normal position by spring 17, or other similar means, valve 27 is moved away from port 24 thus uncovering the same. Inasmuch as chamber 10 is filled with oil, or other braking fluid, this oil is permitted to flow through port 24 into cylinder 19 to completely fill the cylinder as the same is returned to its normal position by the spring 25. This is particularly advantageous if there has been any leakage in the system as in this manner the master cylinder 19 is automatically maintained completely filled with oil and any loss of oil in the system is automatically compensated for.

Obviously when the brake pedal 16 is released spring 25 returns cylinder 19 to its initial or normal position illustrated in Figure 1 and this movement of cylinder 19 draws or permits the fluid in the system and consequently in the brake cylinders located at the several brakes to flow back through the system and into the master cylinder 19. In order that the pressure in the pressure chamber 31 may not be built up to such an extent as to retard or prevent the back flow of the braking fluid I provide a relief port 32 in one wall of the master cylinder and arrange to control this relief port by means of a pressure actuated relief valve 33. This valve is constructed to open relief port 32 when the pressure built up by the returning brake fluid reaches a predetermined point. By this arrangement the braking fluid may freely return to the master cylinder from the brake cylinders whereby the prompt release of the brake shoes is insured. The port 32 is so positioned with respect to the longitudinal length of the master cylinder 19 that it is covered and closed by the piston 20 during its pressure stroke.

It is noted that a lug or abutment 34 may be conveniently formed on one of the inner walls of the casing 10 to provide a stop limiting the movement of lever 18 and consequently master cylinder 19 in one direction.

While I have herein illustrated valve 27 as consisting of a semi-spherical or ball valve it will be immediately apparent that various other types of valves may be employed with equal facility, as for instance a tapered, flat, or any other suitably shaped valves.

While it is believed that from the foregoing description the nature and advantages of my invention will be readily apparent, I desire to have it understood that I do not limit myself to what is herein shown and described and that such changes may be resorted to as fall within the purview of the accompanying claims.

What I claim as my invention is:

1. In a hydraulic brake system, a fluid reservoir, a pressure inducing instrumentality in said reservoir including a piston and movable cylinder, a port in said cylinder, an operating lever for said instrumentality and a valve for said port carried by said lever and operable during one stroke of said cylinder.

2. In a hydraulic brake system, a chamber containing a hydraulic medium such as oil, a reciprocable cylinder and piston in said chamber constituting a pressure inducing instrumentality, an oscillatable member for reciprocating said cylinder and means for compensating for leakage in said system including a port in said cylinder and a valve carried by said oscillatable member for closing said port upon the pressure stroke of said cylinder.

3. In a hydraulic brake system, a fluid containing chamber, a pressure inducing instrumentality in said chamber including a piston and a reciprocable cylinder, means normally urging said cylinder in one direction, brake lever operated means for moving said cylinder in the other direction, a port in said cylinder providing communication between said cylinder and chamber and a valve carried by said last named means for closing said port during the movement of said cylinder in one direction.

4. In a hydraulic brake system, a fluid containing chamber, a pressure inducing instrumentality in said chamber including a piston and a reciprocable cylinder, means normally urging said cylinder in one direction, a brake lever operated member for moving said cylinder in the other direction on the pressure stroke of the latter, a port in said cylinder providing communication between said cylinder and chamber and a valve carried by said member for closing said port during the pressure stroke of said cylinder.

5. In a hydraulic brake system, a fluid reservoir, a reciprocable master cylinder in said reservoir, brake lever actuated means for actuating said cylinder on its pressure stroke and means for compensating for leakage in said system including a port in said cylinder communicating with said chamber and a valve carried by said brake lever actuated means for closing said port during the pressure stroke of said cylinder and opening the same upon the return stroke of said cylinder.

6. In a hydraulic brake system, a fluid containing chamber, a pressure inducing instrumentality in said chamber including a piston and a reciprocable cylinder, a movable member for reciprocating said cylinder, said cylinder having a port providing for the admission of the fluid into the same to compensate for leakage in the system, and a valve carried by said movable member for closing said port upon the pressure stroke of said cylinder.

7. In a hydraulic brake system, a pressure inducing instrumentality including a piston member and a cylinder member, said members being mounted for relative movement, means normally urging one of said members in one direction, said last mentioned member having a port providing for the admission of a fluid into the space between the members, an actuating lever for moving said last mentioned member in the other direction, and means carried by said lever for closing the said port during movement of said ported member by said lever, said means comprising a valve mounted in a substantially semi-spherical recess formed in one end of said lever, and resilient means holding said valve in position in said recess.

In testimony whereof I affix my signature.

HORACE T. THOMAS.